(12) United States Patent
Rabinowitz

(10) Patent No.: US 6,716,465 B2
(45) Date of Patent: Apr. 6, 2004

(54) METHOD OF PRODUCING AQUEOUS EXTRACTS FROM ALMOND HULLS

(76) Inventor: Israel N. Rabinowitz, 2534 Foothill Rd., Santa Barbara, CA (US) 93015

( * ) Notice: Subject to any disclaimer, the term of this patent is extended or adjusted under 35 U.S.C. 154(b) by 269 days.

(21) Appl. No.: 10/050,398

(22) Filed: Jan. 15, 2002

(65) Prior Publication Data

US 2002/0132031 A1 Sep. 19, 2002

Related U.S. Application Data

(60) Provisional application No. 60/307,623, filed on Jul. 24, 2001, provisional application No. 60/307,648, filed on Jul. 24, 2001, provisional application No. 60/307,622, filed on Jul. 24, 2001, and provisional application No. 60/262,709, filed on Jan. 19, 2001.

(51) Int. Cl.$^7$ ............................................. A23L 1/015
(52) U.S. Cl. ........................................ 426/431; 429/489
(58) Field of Search .......................... 426/430, 431, 426/482, 489; 210/650

(56) References Cited

U.S. PATENT DOCUMENTS

| 4,997,489 A |   | 3/1991 | Rabinowitz |
| 5,064,762 A |   | 11/1991 | Rabinowitz |
| 5,160,756 A |   | 11/1992 | Rabinowitz |
| 5,624,699 A | * | 4/1997 | Lang ........................... 426/425 |
| 5,626,847 A | * | 5/1997 | Agrawal et al. ............ 424/750 |

FOREIGN PATENT DOCUMENTS

| WO | 95/05091 | * | 2/1995 |

* cited by examiner

*Primary Examiner*—Keith Hendricks
(74) *Attorney, Agent, or Firm*—Donald D. Mon

(57) ABSTRACT

Commuting dry almond hulls into fine particles, infusing the particles with water, extracting soluble compounds from them in a counter-current aqueous process. Separating the fibers to provide an aqueous solution, and ultrafiltering the remaining aqueous solution to provide ingredients for products such as sports beverages, health drinks, fruit bars, jams, jellies, and fibers. If desired, the aqueous solution from counter-current extraction can be treated with a yeast to increase the inositol content of the aqueous solution.

10 Claims, 1 Drawing Sheet

METHOD OF PRODUCING AQUEOUS EXTRACTS FROM ALMOND HULLS

CROSS REFERENCE TO OTHER APPLICATIONS

Applicant claims the benefit of the following four United States provisional patent applications:
SPORTS BEVERAGE/HEALTH DRINK, Serial No. 60/262,709 filed Jan. 19, 2001
COMBINATION OF ALMOND FRUIT EXTRACTS OFFERING POTENTIAL SYNERGISTIC HEALTH EFFECTS, Serial No. 60/307,623, filed Jul. 24, 2001
ENHANCED PRODUCTION OF INOSITOL, INOSITOL PHOSPHATES, FLAVONOIDS, PHENOLIC ACIDS, PHOLYPHENOLICS, AND TERPENES, FROM MESOCARP OF PRUNUS AMYGDALUS, Serial No. 60/307,648 filed Jul. 24, 2001
UNIQUE DIETARY FIBER PRODUCTS FROM THE FRUIT OF SWEET ALMOND (PRUNUS AMYGDALUS), Serial No. 60/307,622. filed Jul. 24, 2001

FIELD OF THE INVENTION

Extract from almond hulls of compounds and fiber beneficial to humans, providing sports beverages, health drinks an ingredients for fruit bars, jams and jellies, and related methods.

BACKGROUND OF THE INVENTION

The sweet almond, prunus amygdalus, is a stone fruit which has several unique features. It is commercially cultivated where there are long, hot, Mediterranean like summers, such as exist in Spain, Morocco, Armenia, Iran, Italy, California (U.S.A.), Australia, et al. It is unique, in that unlike others in its botanical family, such as the peach, apricot and plum, where the flesh (mesocarp) of the fruit is eaten and the seed within its shell, or stone (endocarp) is discarded, the reverse is true for the almond Early in its maturation cycle, for a period of a few weeks, the entire fruit (seed, endocarp, and mesocarp) can be, and is, eaten, in several parts of the world. As the maturation cycle continues, the seed finally becomes the almond "nut" of commerce, and the endocarp (shell), and mesocarp are gathered aside for low value uses, such as cat litter and animal feed. The mesocarp has become dry, leathery, and astringent to the taste, reflecting the fact that the mature sweet almond mesocarp has an unusually high concentration of flavonoids compared to its botanical relatives, as well as to other fruits. This is thought to be a consequence of the length of time that the mesocarp is subject to intense heat, ultraviolet radiation, and pest infestation, as the flavonoids play protective roles against all three of these plant stress factors. The extended maturation period of the mesocarp, flowing into a remarkably stable senescence period, also allows for biosynthesis of lignans in the mesocarp, compared to the comparative absence of those compounds in other fruits. The mesocarp, in senescence, following harvest of the nut meats, remains remarkably stable in that it retains its high sugars, flavonoid, and lignan content, for years, so long as the mesocarps, referred to familiarly as "hulls," remain in their dry harvested condition, having approximately 8%–20% water content, usually averaging about 12% free water.

In addition to these dry solubles, the hulls also contain insoluble fiber of cellulose, hemicellulose, pectins, tannin-like complex polyphenols, and ash. As dry hulls, therefore, the almond mesocarp represent a potential source of useful foods, food additives, pharmaceuticals, and feed additives, over and above low value usage as roughage or cat litter.

This invention describes the creation of a beneficial sports beverage that contains a unique natural mixture of sucrose, invert sugars, inositol, inositol phosphates, sorbitol, vitamin C, flavonoids, lignans, sodium and potassium, and smaller concentrations of soluble oligosaccharides, and tannin like complex polyphenols.

The mixture of sucrose, glucose, and fructose, and the oligosaccharides in these hulls, provide a source of sugar for energy metabolism, in a "metered" format, in that the sucrose and glucose are readily absorbed and metabolized, followed by fructose, and then the oligosaccharides. In this manner, a given volume of ingested beverage, which of course is predominantly water, will supply a more advantageous longer lasting input of energy providing carbohydrates, than a beverage containing, for example, merely glucose, or sucrose. Water replenishment is essential during periods of vigorous exercise, as well as during more average daily activities. However, excessive imbibition of water, can lead, minimally, to feelings of bloat and nausea, and potentially to the more serious life threatening effects of water intoxication, or hyponatremia.

Inositol and sorbitol, are both polyol molecules, and are also well known as "compatible osmolytes". They aid restoration of homeostatic osmotic strength of plasma, and intracellular fluid. In restoration of normal osmotic strength, the compatible osmolytes inositol and sorbitol are uncharged molecules adding to total osmolality, replacing higher concentrations of charged ions, which, in excess, interfere with normal enzyme activity via effects on enzyme (protein) active configurations.

In addition to compatible osmolyte function, the polyol molecules can also contribute to "hyperhydration" activity, very recently found to be a beneficial function of another polyol molecule, glycerol, in vigorous exercise. Hyperhydration intervention has also recently been postulated to be useful in preventing syncope (dizziness, and fainting) for astronauts upon return to normal gravity, after extended periods in zero gravity.

Inositol has further been found to be effective in promoting insulin activity, and thereby, effective glucose metabolism both as inositol, and as "downstream" metabolites of inositol which are active in glucose transport.

Finally, inositol and its metabolites, play essential roles in muscle recovery following sustained muscular activity, as part of the manifold of events which reconstitute the actin filaments of muscle structure.

The flavonoids in the almond hull beverage possess antioxidant activity currently thought to be effective in muscle recovery following strenuous exercise. Further, for very active athletic activity, over long periods of time, the potential for accumulated DNA damage, as well as damage to other biomolecules, through oxidative attack, can represent the first step in the multifactorial etiology of certain cancers which may not fully develop until many years have passed. Vigorous exercise is a high oxidation activity, and therefore the flavonoids in the almond hull beverage aid muscle recovery, and athletic performance in the immediate term, and contribute to long term health status through a lifetime. The flavonoids are also now well known to act as protective agents for the circulatory system and heart.

The lignans and tannin like polyphenolics also possess health protective activities, although the putative mechanisms of action for the higher molecular weight tannin like molecules are less well known at this time.

Sodium replenishment during prolonged, very vigorous exercise, is now recommended. For less vigorous activities, the major value of sodium in beverages is to increase palatability. Potassium plays an important role in muscle recovery and rehydration of intracellular fluid.

As the natural constituents of a fruit juice obtained from mature almond mesocarps (hulls) are beneficial for health, and for athletic performance, this juice should be obtained with as little loss of constituents as possible, compatible with maximal economic recovery of juice.

The above and other features of this invention will be fully understood from the following detailed description and the accompanying drawings in which:

BRIEF DESCRIPTION OF THE DRAWINGS

The single FIGURE is a process diagram showing the preferred features of the invention.

DETAILED DESCRIPTION OF THE INVENTION

Figure 1:
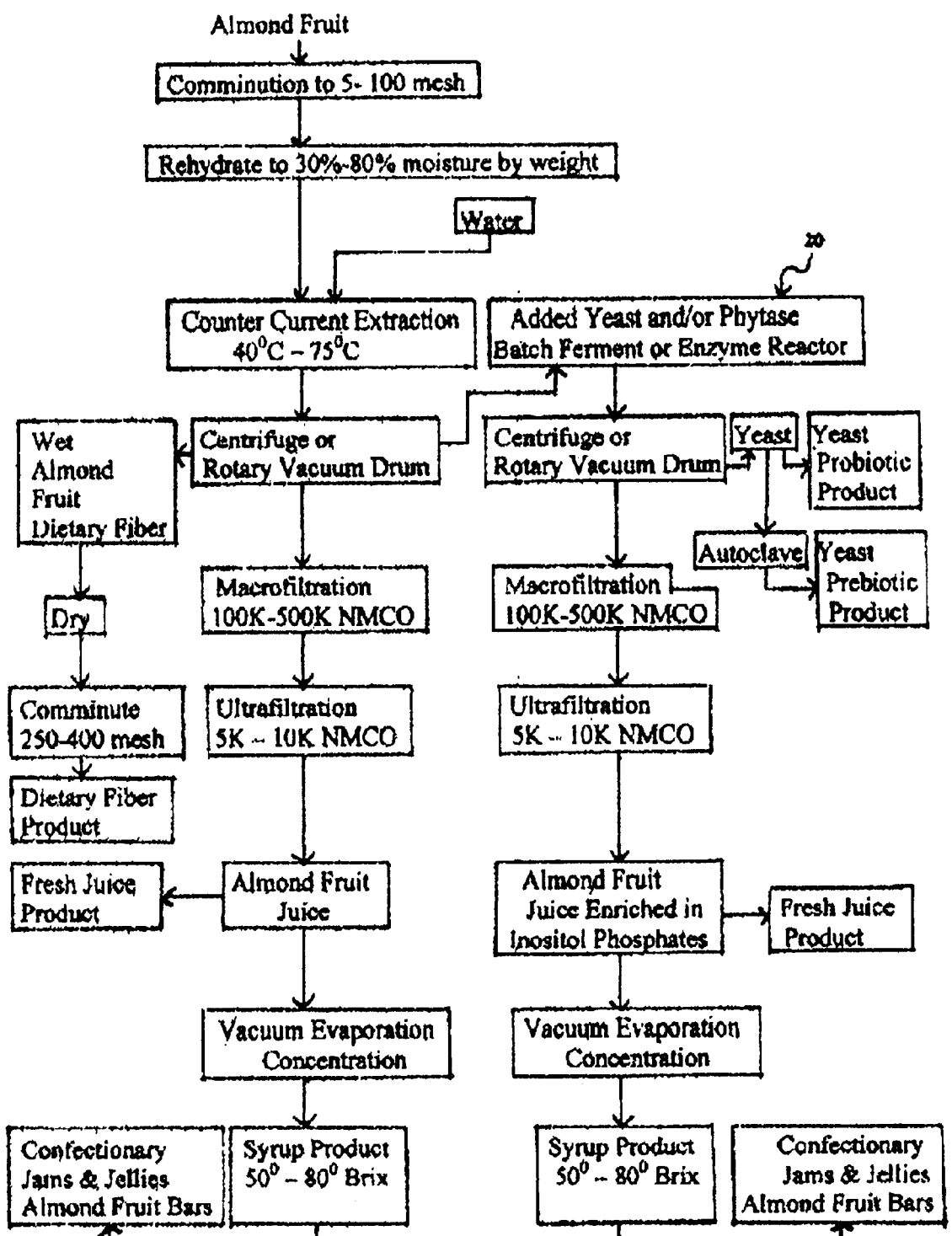

Dry almond hulls, typically in the range of 6%–15% free water content, are initially ground to a particles in the range of 10–40 mesh (ASTM), using well known comminution equipment, such as the Fitzpatrick mill. This reduction in size is to enable more efficient hot water extraction of the more complex, higher molecular weight polyphenolics, which are cell-structure bound, rather than free in solution in cell vacuoles.

It is well known that many fruit juices are produced by variations of press procedures on the fruits which are naturally composed of 50%–90% moisture containing the juice molecules of interest. Extraction efficiency of juices from such fruits, using press procedures, is in the range of 55%–75%. Continuous counter current juice extraction from the same fruits can increase extraction efficiency to 80%–98%.

The almond fruit (hull) is harvested at approximately 5%–20% moisture content, typically about 10%–12% moisture. The hull, depending upon varietal, geographic, and seasonal variations, can have upwards of 50%–60% water solubles content. At 10% incoming as is total moisture content, the hull solubles cannot be extracted by press procedures or by continuous counter current procedures. The hulls must first undergo a water imbibition step, to raise the moisture content into the range of 50%–80%. At this moisture content, the intact hulls can be subjected to counter current extraction for economical extraction efficiency.

EXAMPLES

1. Using intact hulls (typically dimensions approximately 1½ inch×¾ inch×⅛ inch) in pilot scale simulated Roberts Battery counter current extraction, following preliminary water rehydration step, adding water to hulls in the weight ratio of approximately 2.5:1, and with water temperature at 55 degrees C+/−2 degrees C., solubles extraction reaches 93%+/−2% efficiency.

2. Using hulls which have been reduced in size to 1/16–1/8 inch largest diameter, and other variables identical to example 1, the extraction efficiency is increased 98%+/−1%.

The increase in extracted solubles in example 2 vs. example 1 is due to increased extraction of larger molecular weight, more difficulty water soluble, flavonoids, anthocyanidins, polymerized polyphenolics, lignans, lignins, and trace amounts of additional hexoses and pentoses from slight cellulosic and hemicellulosic hydrolysis.

The "Roberts Battery" is one of the earliest process versions of counter current equipment used in both water solubles and oils extraction, still useful in this invention. There are now several commercial continuous counter current extractors in use worldwide, and the choice of a process unit will depend upon the usual features of capital cost, operational cost, efficiency, size, etc.

The rehydrated particles are then extracted with hot water in counter current (CC) fashion, with counter current extractor equipment well known to processors of cane and beet sugar, soy oil, et al. The hot water will be kept in the range of 35 degree celsius–70 degree celsius, preferably 50 degree+/−5 degree in order to minimize degradation of the flavonoid molecules. This temperature range will also inhibit possible bacterial and fungal growth contamination during the counter current extraction period.

The extract juice is separated from the undissolved solids, using conventional equipment such as vacuum rotary drum equipment, or centrifugation.

The juice, now separated from most of the suspended solids, will be subject to stages of ultrafiltration (UF), starting with UF of approximately 100,000–300,000 NMCO (Nominal Molecular Weight Cut Off), and finishing with UF using 5,000–10,000 NMCO. This will yield a juice with characteristic straw to golden color, sweet fruity taste, and "cold sterilized", to be suitably free of microbiological contamination.

The final juice can have a Brix concentration, whose value reflects the fact that yearly variations occur in solubles content of the several almond varietals that are grown, and are harvested together. Therefore, for purposes of optimal sports beverage benefit, the osmolality of the beverage will be adjusted with addition of pure sterile water, to produce a beverage which has an osmolality close to that of human plasma.

For purposes of wide distribution of the beverage, the CC juice, following UF processing, may be concentrated to a juice "molasses", of 60 degrees Brix–80 degrees Brix, using several stage vacuum evaporation at a temperature not to exceed 70 degree celsius, to minimize degradation of flavonoids. The molasses can now be more economically transported to other locations, and then diluted and packaged for distribution from those locations.

The concentrated juice can also be presented as an elixir supplement. The sports drink, in the range of 8 to 15 degree Brix concentration, is designed so that up to about a liter or so per exercise duration can be consumed for water, energy, and other beneficial components replenishment. A concentrated elixir, in the range of 45 to 80 degree Brix, will be designed for recommended daily consumption of tablespoon quantities. A further presentation of the concentrated juice will be one in which the concentrate in the range of 50 to 80 degree Brix, is combined with the processed hull solids, to produce a solid composition bar.

This concentrate can also be used as a constituent of jams and jellies, and for confectionery uses.

The almond fruit juice, which after ultrafiltration through 10,000 NMCO membrane, can be concentrated to near 80 degrees. Brix pourable syrup, is an excellent fruit syrup, at much lower degree Brix concentrations for preparation of fruit bars, and as an immediate step preparation of fruit jam.

(1) almond fruit jam, almond fruit juice concentrate at approximately 50 degrees Brix concentrate, pH=4.8+/−0.2, is acidified by addition of citric, tartaric, malic, and fumaric acids to pH=4.1. Acidified syrup further concentrated to approximately 62 degrees Brix, at near boiling temperature and atmospheric pressure. A solution of 4 degrees apple pectin in 20% sucrose was added to the concentrate, along with additional citric acid to lower pH further to 3.3+/−0.2, and the mixture stirred and further evaporated to final 75 degrees+/−1 degree Brix. The mixture then poured into aluminum muffin pans for setting to a jam upon cooling.

(2) almond fruit jam prepared with almond fruit pectin. The almond fruit contains pectin in the cellulosic fiber residue collected after juice extraction from the fruit. One pectin fraction recovered from the residue was recovered through a dilute sodium carbonate wash of the fiber, followed by "precipitation" of the pectin with isopropyl alcohol treated suspension. The pectin film was recovered and dried to a powder. This pectin fraction, due to the alkaline wash procedure, is a low methoxy pectin, requiring addition of Ca++ to form a gel with a fruit syrup. The almond fruit juice concentrate used in example 1, above (PH=4.8, 50 degrees Brix) was not further acidified, nor further concentrated. A solution of 4 grams of almond fruit pectin in 100 ml of 20% sucrose was added to the syrup, followed by 1.3 grams of $Ca(H_2 PO_4)_2+H_2O$ (monobasic calcium phosphate). The mixture was stirred, and evaporated back to approximately 52 degrees Brix concentration, and then poured into an aluminum muffin pan for setting to a gel upon cooling.

(3) almond fruit bar 30 ml of a syrup concentrate, pH=4.8 containing 0.5 g of almond fruit low methoxy pectin, plus 150 mg of monobasic calcium phosphate was heated to near boiling, and then 10 g+/−2 g of finely ground (approximately 150 mesh ASTM) dry almond fruit fiber added to the solution, with stirring and then transferred to an aluminum muffin pan for continued heating at 350 degrees F. for 10 minutes and then allowed to cool to a solid bar consistency.

Phytic acid and inositol, both present in the almond hull extract, acting together, have been shown to inhibit certain cancers in experimental animal models, and both phytic acid, and inositol, have also been shown to have lipid and cholesterol lowering effects, thereby promoting healthier vascular and heart function. One type of sports/health beverage to be produced will therefore contain both of these molecules.

Another beverage type to be produced will maximize the hyperhydration and compatible osmolyte actives of the beverage. This will be accomplished by the addition of a phytase enzyme just after the CC step as shown at 20 in FIG. 1.

This will break down the considerable phytic acid content of the mesocarp, yielding additional inositol concentration, additional free sodium, magnesium, calcium and potassium ions, and inositol phosphates. The breakdown of phytic acid also prevents the binding of these beneficial elements in the intestinal tract and plasma of the consumers of the beverage. Phytic acid is well known to be a chelator or cations, especially of the transition elements calcium and magnesium.

Yeasts and fungi which can be used, in batch or fed batch fermentation, of almond fruit juice containing phytic acid, in order to generate inositol phosphates, containing one to five phosphates, and myo-inositol, included, but are not limited to *Saccharomyces cerevisiae, Saccharomyces pombe, Aspergillus ficuum, Aspergillus flavis. Aspergillus niger, Hansenula anomala, Kluyveromyces fragilis, Schwanniomyces castelli, Torulopsis candida*. For use of the intact, viable yeast or fungus, a batch fermentation is run for varying periods of time, typically 5 to 40 hours to generate mixtures of inositol phosphates. To completely hydrolyze phytic acid to myo-inositol and inorganic phosphate, the fermentation is perferably run fed batch mode 24–48 hours.

It is also possible to use pure heat stable phytase enzymes, extracted from yeasts and fungi in a reactor vessel, rather than fermentation mode in order to hydrolyze phytic acid to myo-inositol and inorganic phosphate. There are several such enzymes available, such as the phytase extracted from *Aspergillus fumigatus* (L. Pasamontes, M. Haiker, M. Wyss, M. Tessier, A. P. G. M. van Loon, Appl. Environ. Microbiology 63(5), 1696–1700, 1997). Using such enzymes in a reactor vessel at temperatures between 50 degrees C. and 80 degrees C., usually preferably 65 degrees C.+/−3 degrees C., mixtures of inositol phosphates can be generated in less than 10 hours, and myo-inositol can be produced in less than 24 hours.

A suitable and exemplary finished beverage will have an approximate characteristic analytic profile as follows:

8–15 degree Brix dissolved solids
280–400 mOsm/L osmolality

| sugars: | sucrose 0.4% |
| --- | --- |
| | glucose 2.5% |
| | fructose 2.9% |
| | inositol 0.6% |
| | sorbitol 0.6% |
| | oligosaccharides <0.1% |
| | sodium 5 meq/L |
| | potassium 90 meq/L |
| | polyphenolics (flavonoids, lignans, tannin like molecules) 0.1% |
| | protein <0.02% |
| | lipid <0.05% |

Dry almond hulls in their normal condition contain the various products of interest herein, in a complicated physical structure. Having been dried for a substantial period of time, the moisture is quite low, which has led to stability of the various components. However, inherently the hulls contain substantial amounts of yeasts, fungi and bacteria, in quiescent forms. These microbes, while quiescent, have no affect on the other compositions. But when wet and at suitable temperatures, they will promptly become active degrade them and reduce the concentration of the desired products. It thereby results that maintenance of suitable moisture and temperature after wetting the hulls is requisite for optimum recovery of the desired products.

When considering the physical structure that encloses the components, it should be remembered that the hulls are what remains of a mesocarp (i.e. fruit) structure, having many unique properties of its own. For example, at least when wet it is a semipermeable structure that ordinarily prevents the passage through it of high molecular weight compounds. For this reason it has previously been suggested to manipulate this structure to utilize this feature.

While this previous concept permits extraction of low molecular weight, highly water soluble compounds like sugars, it prevents the effective extraction of larger molecular weight components and less water-soluble components, which are of great importance to the product obtained with this invention. The severe maceration of the hull particles substantially destroys the function of the membranes, and makes available recovery of these other components.

This still does not settle the matter, because both the very soluble and the less soluble compounds must yet be extracted. Counter-current (CC) extraction makes this possible because it takes advantage of the solubility products of both types of compounds.

Again, this separation takes time as does the reconditioning of the macerated particles to thoroughly rehydrate them. The consequence of time is the opportunity for yeasts and other microbes to grow at the expense of the sugars. The sugars, of course, are a primary objective of this invention. Left at room temperature, time spent in processing can result in serious degradation of the products, even producing alcohol.

In this invention the process before ultrafiltration to remove the yeast is maintained at temperatures adverse to yeast proliferation. Generally between about 40 degrees C. and about 70 degrees C., preferably around 55 degrees C. will be used. Thus, the natural tendency for the principal degradation of the production of the desired compounds is prevented.

This invention is not limited by the embodiments shown in the drawings and described in the description, which are given by way of example and not of limitation, but only in accordance with the scope of the appended claims.

I claim:

1. The method of preparing an aqueous extract of water-soluble components of dry almond hulls, comprising the following steps in the order recited:

(a.) comminuting said almond hulls, while dry, to particles between about 5 and about 100 mesh (ASTM);

(b.) soaking the particles from step (a) in water until the water content of the hulls is between about 30% and about 80% by weight;

(c.) utilizing counter-current extraction techniques involving counter-current flow of process water through advancing particles from step (b) to provide a solution of soluble components of said hulls, along with said residue of said hulls;

(d.) physically separating the said solids from said solutions;

(e.) ultrafiltering the solution from step (d) to remove remaining solids, yeasts, and bacteria;

while maintaining the product in steps (a)–(d) at temperatures between about 40 degrees C. and about 75 degrees C.

2. The method of claim 1 further maintaining said temperature through step (e).

3. The method of claim 1 further including this further step of adjusting the Brix value of the resultant solution by addition of water.

4. The method of claim 1 further including the further step of concentrating the solution from step (d) to a syrup useful as syrup or as a constituent of jams or jellies.

5. The method of claim 1, further comprising drying said solids produced from step (d), and commuting said dry solids to form a dietary fiber for food products.

6. The method of claim 1 further comprising evaporating the product of step (e) to form a syrup useful as an ingredient of food products.

7. The method of claim 1, further comprising adding yeast or phytase to said solution produced from step (d), reacting then to increase inositol in the solution, separating solids from said solution and ultrafiltering the product to provide a juice product or ingredient for food products.

8. The method of claim 7 in which the product is concentrated to a syrup useful in food products.

9. A food product of the type of confection, jam or jelly, comprising the product of the method of claim 1 combined with additional confection, jam or jelly ingredients.

10. A fruit product prepared by the method of claim 1 retentive of the antibacterial activity of components thereof.

* * * * *